US009465216B2

(12) United States Patent
Park et al.

(10) Patent No.: US 9,465,216 B2
(45) Date of Patent: Oct. 11, 2016

(54) WEARABLE DISPLAY DEVICE (71) Applicant: INDUSTRY-UNIVERSITY COOPERATION FOUNDATION HANYANG UNIVERSITY, Seoul (KR)

(72) Inventors: Jong-Il Park, Seoul (KR); Byung-Kuk Seo, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 701 days.

(21) Appl. No.: 13/873,585

(22) Filed: Apr. 30, 2013

(65) Prior Publication Data
US 2014/0043212 A1 Feb. 13, 2014

(30) Foreign Application Priority Data

Aug. 7, 2012 (KR) .................. 10-2012-0086484
Aug. 24, 2012 (KR) .................. 10-2012-0092937
Jan. 14, 2013 (KR) .................. 10-2013-0004151
Mar. 26, 2013 (KR) .................. 10-2013-0032228

(51) Int. Cl.
*G02B 27/01* (2006.01)

(52) U.S. Cl.
CPC ......... *G02B 27/017* (2013.01); *G02B 27/0149* (2013.01); *G02B 27/0179* (2013.01); *G02B 2027/0138* (2013.01); *G02B 2027/0156* (2013.01); *G02B 2027/0178* (2013.01)

(58) Field of Classification Search
CPC ............ G02B 27/017; G02B 27/0179; G02B 27/0149; G02B 2027/0156; G02B 2027/0138; G02B 2027/0178
See application file for complete search history.

(56) References Cited

U.S. PATENT DOCUMENTS

| 5,954,642 A | 9/1999 | Johnson et al. | |
|---|---|---|---|
| 7,542,012 B2 | 6/2009 | Kato et al. | |
| 2006/0119539 A1* | 6/2006 | Kato ................. | G02B 27/0176 345/8 |
| 2008/0291277 A1* | 11/2008 | Jacobsen ............ | G02B 27/0172 348/158 |
| 2009/0115687 A1* | 5/2009 | Chiaki ............... | G02B 27/0176 345/8 |
| 2009/0251661 A1* | 10/2009 | Fuziak, Jr. ......... | G02B 27/0172 351/158 |
| 2013/0235331 A1* | 9/2013 | Heinrich ............. | G02C 11/10 351/158 |

* cited by examiner

*Primary Examiner* — Aneeta Yodichkas
(74) *Attorney, Agent, or Firm* — Ladas & Parry LLP (57) ABSTRACT A wearable display device is disclosed, which includes: a frame; a display unit configured to show an image in at least a partial area thereof and positioned in front of a user's eye in a first mode; a main unit coupled to the frame; and a hinge disposed at a coupling point of the display unit and the main unit to enable a rotation of the display unit, where the display unit is rotatable about the hinge by at least 180 degrees. With the device disclosed herein, it possible to prevent malfunctioning and damage even when the device is worn for extended periods, and it is also possible to resolve the problem of the wearable display device obstructing the field of vision when not in use.

13 Claims, 11 Drawing Sheets

WEARABLE DISPLAY DEVICE

CROSS-REFERENCE TO RELATED APPLICATIONS

This application claims the benefit of Korean Patent Application No. 10-2013-0004151 filed with the Korean Intellectual Property Office on Jan. 14, 2013, Korean Patent Application No. 10-2012-0086484 filed with the Korean Intellectual Property Office on Aug. 7, 2012, Korean Patent Application No. 10-2012-0092937 filed with the Korean Intellectual Property Office on Aug. 24, 2012, and Korean Patent Application No. 10-2013-0032228 filed with the Korean Intellectual Property Office on Mar. 26, 2013, the disclosures of which are incorporated herein by reference in their entirety.

BACKGROUND

1. Technical Field

The present invention relates to a wearable display device.

2. Description of the Related Art

The HMD (head-mounted display), a representative type of wearable display device, was designed to provide a pilot with aviation information such as the altitude, velocity, etc., of the aircraft. Commercial products were first developed during the 1990's, and have attracted interest after 1997 due to their popularity.

The HMD may be worn on the head like goggles and may provide the vision of a large screen showing virtual images. The display used here typically has a size of 1 inch or less, which may be magnified a hundredfold with the application of highly advanced optical technology.

With the development and commercialization of accessory devices such as the HMD, further growth is anticipated in the field of wearable computing devices. While previous efforts have focused on developing the HMD for movies or games, rapid advances in the fields of display devices and visual communication, as exemplified by the trends towards higher performance and smaller sizes in computer systems and LCD's, have led to research on wearable monitors, with some products already commercially available.

The HMD market faced many difficulties in the market for the past few years, due to relatively high prices, but the market is expected to grow dramatically in step with the trends in the wearable computer industry. The wearable HMD is expected to expand to industrial sites, logistics warehouses, maintenance sites for large-scale equipment such as cars, airplanes, and ships, etc., as well as to the field of sports entertainment, such as car racing.

In particular, developments in processor and software technology enable the miniaturization of computing devices, and as such, the HMD is expected to evolve beyond simply displaying images to becoming a personal computing device analogous to the smart phone.

Figure 1:
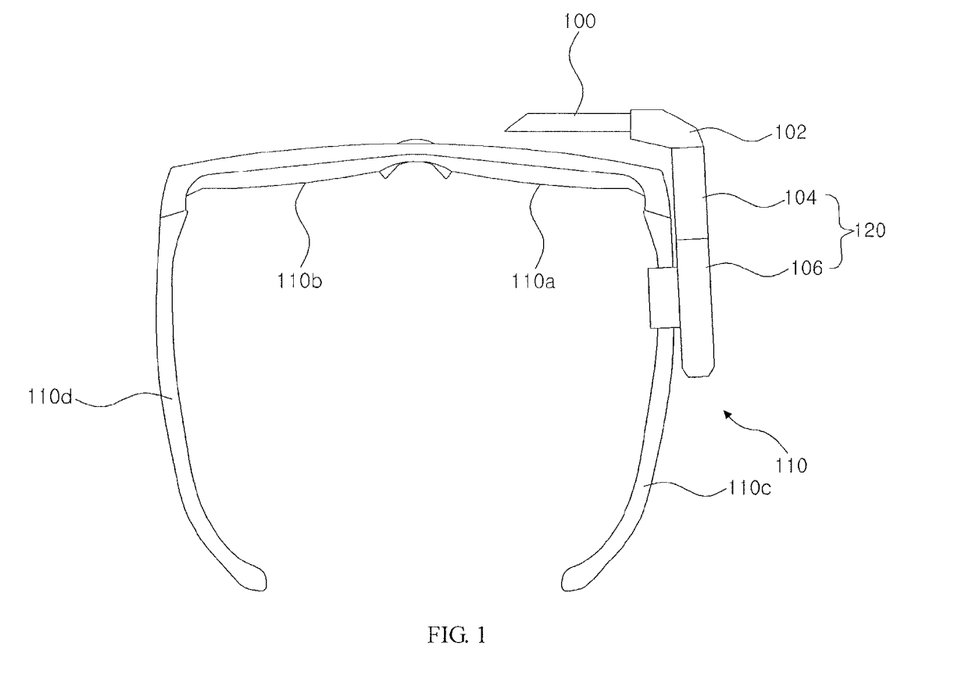
FIG. 1 illustrates an example of a wearable display device that can operate as a computing device.

FIG. 1 illustrates an example of a wearable display device that can operate as a computing device.

Referring to FIG. 1, a wearable display device according to the related art can include an image viewer unit 100, a connection unit 102, a main unit 120 that includes an interface unit 104 and a processor unit 106, and a frame 110.

The frame 110 may form the main body of the wearable display device and, for example, can have a structure similar to a pair of glasses, as illustrated in FIG. 1. The frame can be structured to be wearable on the user's head, and the other components of the wearable display device may be coupled onto the frame 110.

The image viewer unit 100 may serve to show images and may be positioned in front of the user's eye.

The main unit 120, composed of the interface unit 104 and the processor unit 106, may be coupled to the frame 110, for example on a support part 110c of the frame 110 for wearing on the user's ear.

The interface unit 104 may provide an interface with which the user can input a control command. The interface unit 104 can include a number of buttons and can include a flat touch pad for inputting cursor movements. By using the interface unit 104, the user can input a necessary control command, such as for playing a video clip and searching information, for example.

The processor unit 106 may control the operations of the wearable display device for use as a computing device. The user's control commands inputted through the interface unit 104 may be provided to the processor unit 106, after which the processor unit 106 may then process the user's control commands.

In a wearable display device according to the related art, such as that illustrated in FIG. 1, the image viewer unit 100 may be installed in front of the user's eyes and may thus obstruct the user's field of vision when it is not in use.

Also, in the wearable display device according to the related art, the interface unit 104 may be fixed to the frame and exposed to the exterior, forming a structure that is vulnerable to damage caused by dust and moisture, etc.

Thus, the wearable display device according to the related art, when worn for extended periods, can cause considerable discomfort due to the obstruction of vision and can be more susceptible to damage.

SUMMARY

An aspect of the invention is to propose a wearable display device of which malfunctioning and damage can be prevented even when the device is worn for extended periods.

Also, an aspect of the invention is to propose a wearable display device that does not obstruct the user's field of vision when not in use.

One aspect of the invention provides a wearable display device that includes: a frame; a display unit configured to show an image in at least a partial area thereof and positioned in front of a user's eye in a first mode; a main unit coupled to the frame; and a hinge disposed at a coupling point of the display unit and the main unit to enable a rotation of the display unit, where the display unit is rotatable about the hinge by at least 180 degrees.

In a second mode, the display unit may be rotated to be placed in contact with the main unit or in proximity with the main unit within a preset distance.

In the first mode, the display unit and the main unit may be disposed orthogonally to each other, and in the second mode, the display unit may be rotated by approximately 270 degrees.

The main unit may include an interface for control.

When the display unit is placed in contact with the main unit by the rotation, the display unit may be placed in contact with at least the interface of the main unit.

The wearable display device may further include a rotation control part configured to automatically rotate the display unit.

The wearable display device may further include a detector part configured to detect a dangerous condition for a user, where the rotation control part may rotate the display unit if a dangerous condition for the user is detected by the detector part.

The wearable display device may further include a mode setter part, which may be configured to determine whether the display unit is in an extended state, such that the display unit is positioned in front of the user's eye, or in a retracted state, such that the display unit is placed in contact with the main unit, and which may also be configured to deactivate some of the preset functions if the display unit is in the retracted state.

The rotation control part may automatically rotate the display unit if power is turned off or if the usage time exceeds a preset threshold amount of time.

Another aspect of the invention provides a wearable display device that includes: a frame; a main unit coupled to the frame; a display unit, which is coupled to the main unit and is configured to show an image in at least a partial area thereof and positioned in front of a user's eye in a first mode; and a hinge disposed at a coupling point of the display unit and the main unit to enable a rotation of the display unit, where the display unit is rotated in a second mode to be placed in contact with the main unit or in proximity with the main unit within a preset distance.

Still another aspect of the invention provides a wearable display device that includes: a frame; a main unit coupled to the frame; a hinge coupled to the frame; and a display unit, which is coupled to the hinge, is configured to show an image in at least a partial area thereof, and is positioned in front of a user's eye during use, where the display unit is capable of rotating at least 180 degrees by way of the hinge.

Yet another aspect of the invention provides a wearable display device that includes: a frame; a main unit coupled to the frame; a display unit configured to show an image in at least a partial area thereof; and a hinge for rotating the display unit, where the display unit is capable of rotating at least 180 degrees between a position in front of a user's eye to the main unit while the wearable display unit is worn by the user.

An aspect of the invention makes it possible to prevent malfunctioning and damage, even when the device is worn for extended periods.

Also, an aspect of the invention can resolve the problem of the wearable display device obstructing the field of vision when not in use.

Additional aspects and advantages of the present invention will be set forth in part in the description which follows, and in part will be obvious from the description, or may be learned by practice of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Figure 2:
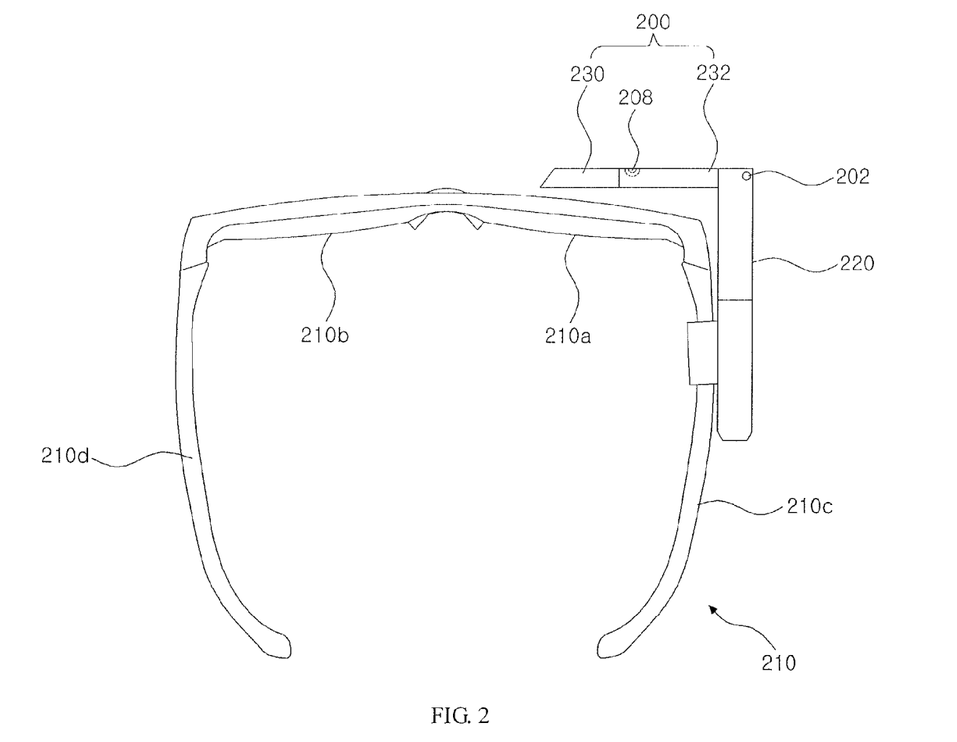
FIG. 2 illustrates an example of a wearable display device according to an embodiment of the invention.

FIG. 2 illustrates an example of a wearable display device according to an embodiment of the invention.

Referring to FIG. 2, a wearable display device according to an embodiment of the invention can include a display unit 200, a hinge 202, a main unit 220, a sensor unit 208, and a frame 210.

The frame 210 may form the main body of the wearable display device and can have a structure similar to that of a pair of glasses, for example, as illustrated in FIG. 1. The frame may be structured to be wearable on a user's head, and other components of the wearable display device may be coupled onto the frame 210.

The display unit 200 may include an image viewer unit 230, a connection unit 232, and a sensor unit 208. The image viewer unit 230 may serve to show images and may be positioned in front of the user's eye. The connection unit 232 may serve to connect the image viewer unit 230 with the hinge 202. Here, the sensor unit 208 can include an image sensor such as a camera, which may obtain image information in front of the eye.

The frame 210 can be made from various materials including metals and dielectrics, but using a dielectric material can be considered so as not to influence computing operations and RF signal reception.

While FIG. 2 illustrates an example in which the frame is of a similar form to that of a pair of glasses, the frame 210 can take any form that is wearable on the user's body. For instance, the frame can take the form of a helmet or a set of headphones.

In cases where the frame has a form similar to a pair of glasses, an example of which is illustrated in FIG. 2, the frame may include two lens-mounting parts 210a, 210b. A user who needs prescription glasses can mount lenses onto the lens-mounting parts 210a, 210b for use.

Also, the frame 210 may include two support parts 210c, 210d for wearing the frame on the user's ears.

The main unit 220 can be equipped with a processor for controlling the wearable display device, and an interface means can be provided by way of the main unit.

The main unit 220 may be coupled to the frame 210 and may be coupled, for example, on a support part 210c of the frame 210 intended for wearing on the user's ear.

The interface provided by the main unit 220 may serve to receive control information from the user and provide it to the processor. The interface may receive control information for turning the power on or off, as well as various control information related to the operation of the wearable display device, from the user. For example, various control commands such as for playing a video clip, making a voice call, searching information, etc., can be provided through the interface.

The interface can be implemented in various forms. For example, it is possible to provide control information through a number of buttons, and it is also possible to provide a flat touch pad such as that for a mouse controller on a laptop.

The image viewer unit 230 can have a size of about 1 inch in the form of a micro-display and can show images using various known methods. It may be preferable to have the image viewer unit 230 made of a transparent material, so as not to obstruct the user's field of vision when there is no image being shown, but it is also possible to use an image viewer unit that does obstruct the field of vision.

In order to show an image on the image viewer unit 230, an external light source can be used, or a self-illuminating system can be used.

An example of using a self-illuminating system is to use OLED's. An OLED contains electrons and holes, which undergo an excitation state and then recombine to produce light. As it can emit light by itself, it is possible to show images without a separate external light source.

An example of using a system with an external light source is to use a transparent display. One such example is the TFT-LCD, which is structured such that light emitted from a fluorescent lamp is directed towards a liquid crystal panel by a device that reflects and disperses the light. The liquid crystal panel includes twisted nematic (TN) liquid crystals filled in between two glass sheets; the glass sheet on the side where light enters includes TFT and ITO pixels and a liquid crystal alignment layer, while the glass sheet on the other side is structured with a color filter and a coated liquid crystal alignment layer (polyimide).

Another example of using a system with an external light source is to use a reflective display. One example of a reflective display is the LCos, in which light is reflected with a reflective display to show images. A silicon substrate is mainly used for the display element, and it is possible to show images of a high resolution on a small display screen.

In a wearable display device according to the related art, such as that illustrated in FIG. 1, the image viewer unit 230 may be installed in front of the user's eye, so that when it is not in use, the user's field of vision may be obstructed.

Also, in a wearable display device according to the related art, the interface unit 104 may be fixed onto the frame, with the interface unit exposed to the exterior and vulnerable to damage caused by dust and moisture, etc.

Thus, a wearable display device according to the related art, if worn for extended periods, can cause considerable discomfort due to the obstructed field of vision and can be subject to an increased likelihood of damage.

In a first mode (use state), the display unit 200 of a wearable display device according to an embodiment of the invention may be positioned in front of the user's eye, but in a second mode (non-use state), the wearable display device may operate to remove the display unit 200 from the user's field of vision by way of rotation using the hinge 202. That is, the display unit 200 can be rotated 180 degrees or more between a position in front of the user's eye and the main unit 220. Here, a non-use state refers to a state in which no images are seen on the display unit 200. That is, the non-use state can be a state in which functions of the wearable display device other than those of the display unit 200, such as voice call functions, etc., are activated. In the non-use state, at least one or more of the image viewer unit 230 and the sensor unit 208 can be deactivated. By having the display unit 200 rotated and the camera deactivated, the user of the wearable display device is prevented from secretively photographing another person.

The display unit 200 and the main unit 220 may be disposed orthogonally or at an angle close to an orthogonal angle to each other, and the hinge 202 may be disposed at the point where the orthogonally disposed display unit 200 and main unit 220 are coupled. Of course, the hinge can also be disposed at a point of intersection between lines extending from the display unit 200 and the main unit 220.

A hinge 202 according to a preferred embodiment of the invention may be structured to allow the display unit 200 to rotate at least 180 degrees or more (preferably 270 degrees). The hinge 202 may be disposed at the coupling point of the display unit 200 and the main unit 220, and by rotating the display unit 200, the display unit 200 can be placed in contact with or be separated at a very close distance from the main unit 220. That is, in cases where the display unit 200 is rotated 270 degrees, the display unit 200 may operate as a cover that shields at least a partial area of the main unit 220.

The hinge structure is described below in more detail with reference to the drawings. In addition to the hinge structure described below, various other hinge structures capable of rotating 180 degrees or more can be applied.

Figure 3A:
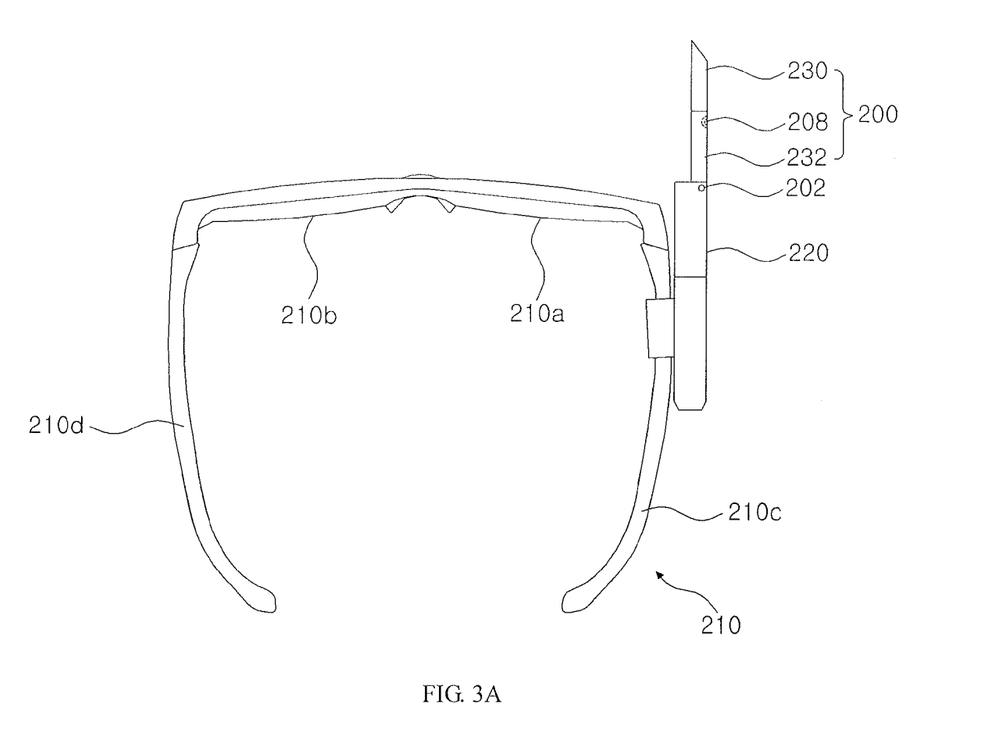
FIG. 3A illustrates a wearable display device according to an embodiment of the invention with the display unit rotated 90 degrees.
Figure 3B:
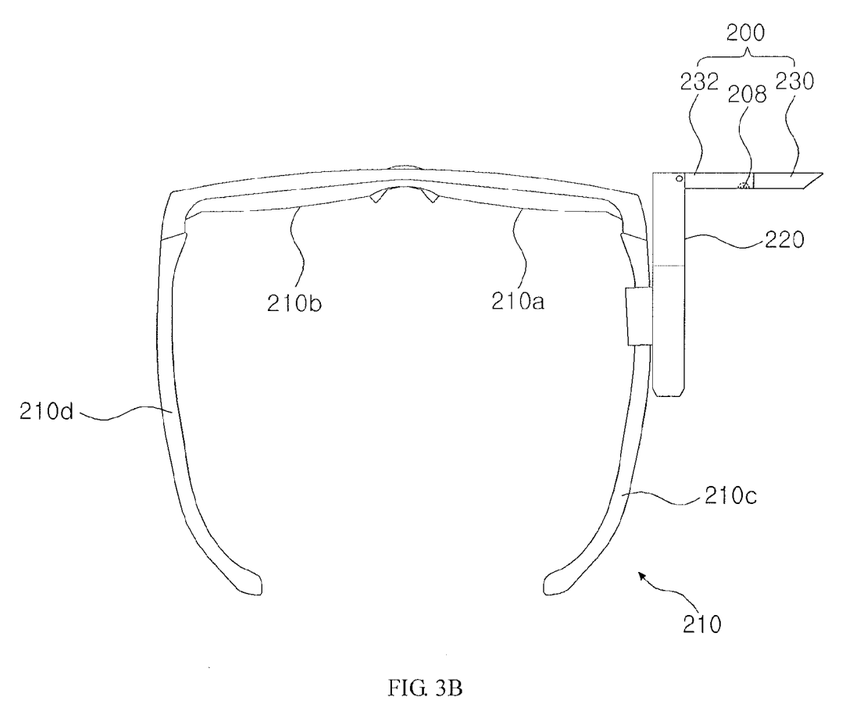
FIG. 3B illustrates a wearable display device according to an embodiment of the invention with the display unit rotated 180 degrees.
Figure 4:
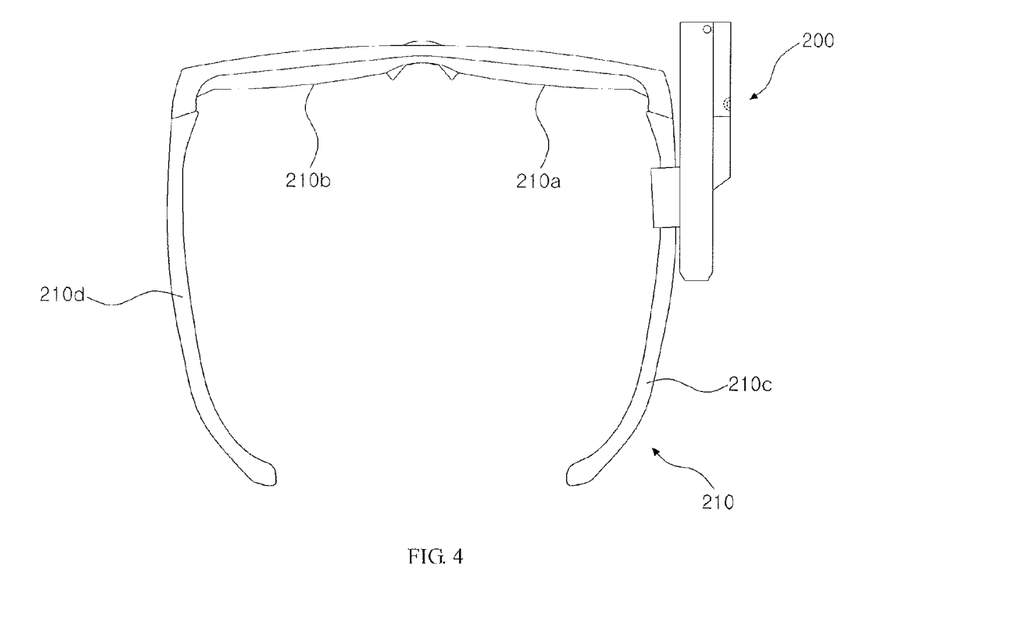
FIG. 4 illustrates a wearable display device according to an embodiment of the invention with the display unit rotated 270 degrees.

FIG. 3A and FIG. 3B illustrate a wearable display device according to an embodiment of the invention with the display unit rotated 90 degrees and 180 degrees, while FIG. 4 illustrates a wearable display device according to an embodiment of the invention with the display unit rotated 270 degrees.

Referring to FIGS. 3A, 3B, and 4, a display unit 200 in an embodiment of the invention may be rotatable about the hinge in a clockwise direction and may be rotatable by about 270 degrees.

In the use mode, the user may dispose the display unit 200 to be orthogonal to the main unit 220, as illustrated in FIG. 2, to be positioned in front of the user's eye.

Also, in the non-use mode, the user may rotate the display unit 200 by about 270 degrees, as illustrated in FIG. 4, such that the display unit 200 is substantially parallel to the main unit and operates as a cover for the main unit.

If the display unit 200 is rotated 270 degrees as in FIG. 4, the display unit 200 may be removed from the user's field of vision, and therefore, the problem of the wearable display obstructing the user's field of vision can be resolved.

Also, with the hinge 202 disposed at the point where the main unit 220 and the display unit 200 are coupled to each other, the display unit 200 can be rotated by about 270 degrees. Thus, in the non-use state, the display unit 200 can cover the main unit 220 while in contact with or in close proximity to the main unit 220, thereby preventing the main unit 220 from being exposed to the external environment. In cases where the main unit 220 and the display unit 200 have different sizes, an advantageous design of the structure can have the display unit 200 covering at least the interface of the main unit 220.

According to a preferred embodiment of the invention, an elastic structure can be applied to the coupling part of the hinge 202 and the display unit 200, so that the display unit 200 can be kept at a rotated state of 0 degrees or 270 degrees.

According to an embodiment of the invention, the rotating operation of the display unit 200 can be achieved manually.

According to another embodiment of the invention, the rotating operation of the display unit 200 can also be achieved automatically by using a motor. On a particular position of the wearable display device, an interface can be provided such as a button for controlling the rotating operation of the display unit 200, and the rotating operation of the motor can be controlled by such an interface.

The rotating operation of the display unit 200 can also be automatically performed when a particular condition is detected, not just when there is a request from the user.

Figure 9:
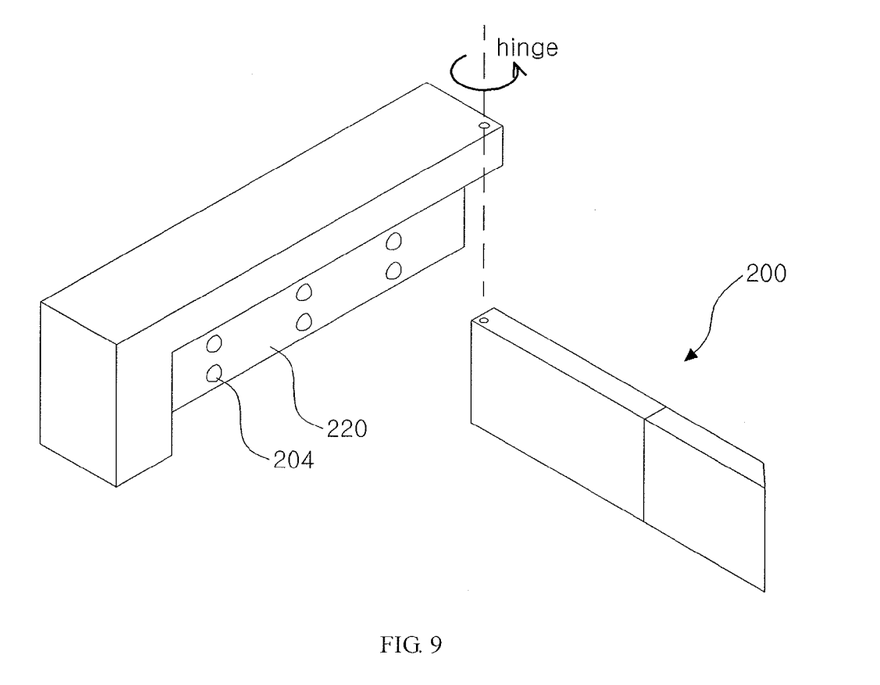
FIG. 9 is an exploded perspective view of a display unit and a main unit according to an embodiment of the invention.
Figure 10:
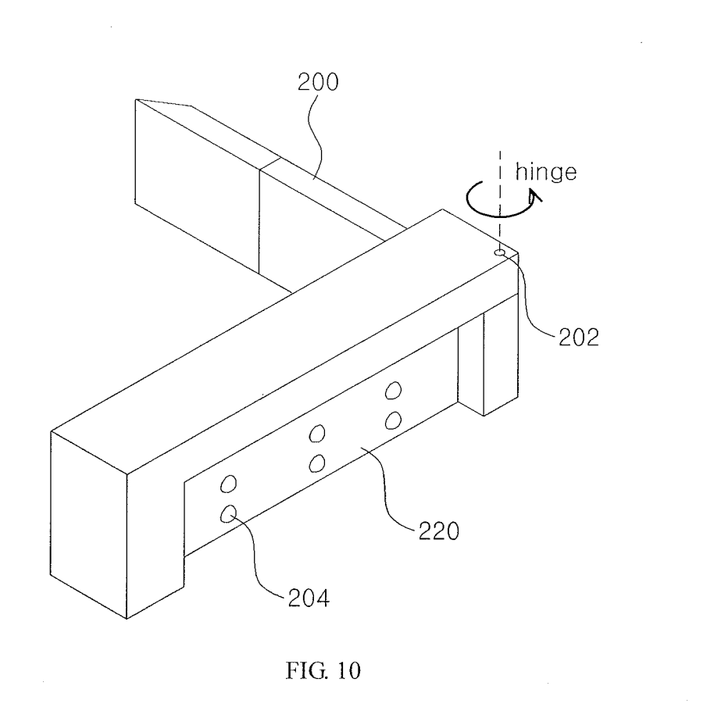
FIG. 10 is an assembled perspective view of a display unit and a main unit according to an embodiment of the invention.
Figure 11:
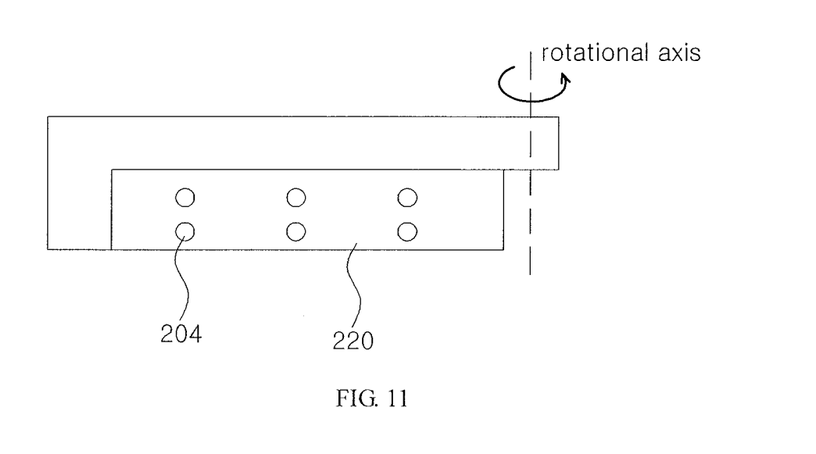
FIG. 11 is a front view of the main unit in a wearable display device according to an embodiment of the invention.

FIG. 9 is an exploded perspective view of a display unit and a main unit according to an embodiment of the invention, FIG. 10 is an assembled perspective view of a display unit and a main unit according to an embodiment of the invention, and FIG. 11 is a front view of the main unit in a wearable display device according to an embodiment of the invention.

Referring to FIG. 9 through FIG. 11, in the main unit 220, the interface 204 may be formed in a grooved area that is at a different level compared to other portions.

The hinge 202 may be formed at a coupling point of the main unit 220 and the display unit 200, and by way of the hinge 202, the display unit 200 may be provided with a structure that is rotatable by approximately 270 degrees.

In the perspective view of FIG. 10, if the display unit 200 is rotated 270 degrees, the display unit 200 can be inserted into the groove in which the interface is formed and can thus operate as a cover for the interface.

Figure 12:
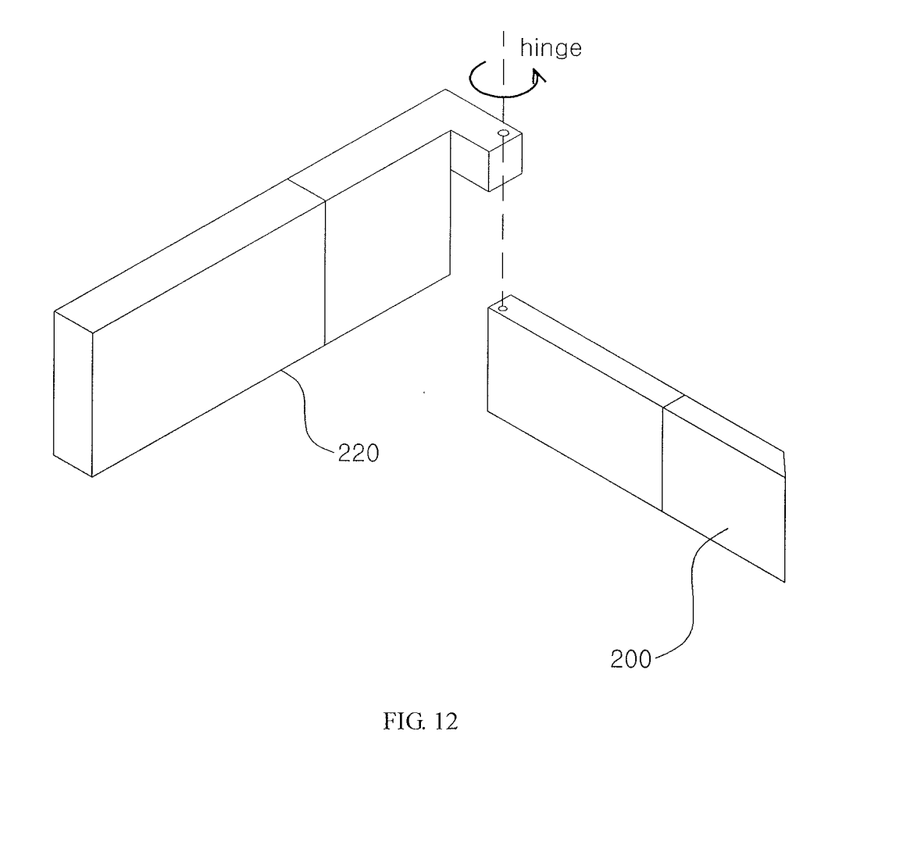
FIG. 12 is an exploded perspective view illustrating the coupling structure of the display unit 200 and the main unit 220 of a wearable display device according to another embodiment of the invention.

FIG. 12 is an exploded perspective view illustrating the coupling structure of the display unit 200 and the main unit 220 of a wearable display device according to another embodiment of the invention.

Referring to FIG. 12, another possible structure is to have a portion protruding from the main unit 220 and have the hinge and display unit 200 coupled to the protruding portion. The structure illustrated in FIG. 12 can also provide a 270-degree rotation of the display unit 200.

A wearable display device based on an embodiment of the invention can be equipped with a sensor unit 208 for detecting a particular condition.

The sensor unit 208 may acquire information regarding the user's surroundings. A first function of the sensor unit 208 may be to acquire image information in a front direction of the user. The image information in front of the user may be acquired to detect dangerous objects. Here, a dangerous object refers to a fast-moving object such as a car, etc., which can threaten the user's safety.

A second function of the sensor unit 208 may be to detect environment information of the surroundings, such as illuminance and temperature. The detection of the environment information of the surroundings such as illuminance can be used to determine whether the user is in an indoor environment or an outdoor environment.

A third function of the sensor unit 208 may be to detect a movement speed of the user. The sensor unit 208 can employ an acceleration sensor, etc., to detect the movement speed of the user.

The sensor unit 208 can include a multiple number of sensors to perform the first to third functions described above.

It may be advantageous to dispose the sensor unit 208 at a position for effectively detecting dangerous objects in front of the user, for instance by coupling it onto the connection unit 232.

The processor embedded in the main unit may analyze the detection information acquired by the sensor unit 208 to determine whether or not the user faces a dangerous condition. The processor may analyze the image information acquired by an image sensor included in the sensor unit 208, for example, to determine whether or not there is a dangerous object in the surrounding area and whether or not the dangerous object is approaching the user at a high speed.

On determining that a dangerous object is approaching the user, the processor may automatically rotate the display unit 200. If a mechanism for automatically rotating the display unit 200 is not available, the processor can also output alarm information to prompt the user to rotate the display unit 200.

Also, the processor can analyze the surrounding environment information detected by the sensor unit 208 to determine whether the user is located indoors or outdoors. If the user is located indoors, the function for detecting whether or not a dangerous object is approaching and the function for outputting alarm information could be deactivated in order to reduce battery consumption.

Also, the processor can determine the movement speed of the user based on the detection results of the sensor unit 208, and the user's movement speed can be utilized as supplementary information in determining whether or not to activate the function for detecting the approach of dangerous objects.

According to another embodiment of the invention, the processor can rotate the display unit 200 also in cases where the movement speed of the user exceeds a preset threshold.

According to yet another embodiment of the invention, the display unit 200 can rotate automatically when the power is turned off for the wearable display device or when an allowed usage time is exceeded.

A wearable display device based on an embodiment of the invention may preferably operate in a power-save mode when the display unit 200 is rotated and placed in contact with the main unit. When the display unit 200 is in contact with the main unit, it may be preferable to change the mode such that the image viewer function and audio output function are deactivated and only the function for outputting a preset alarm sound is activated.

Figure 5:
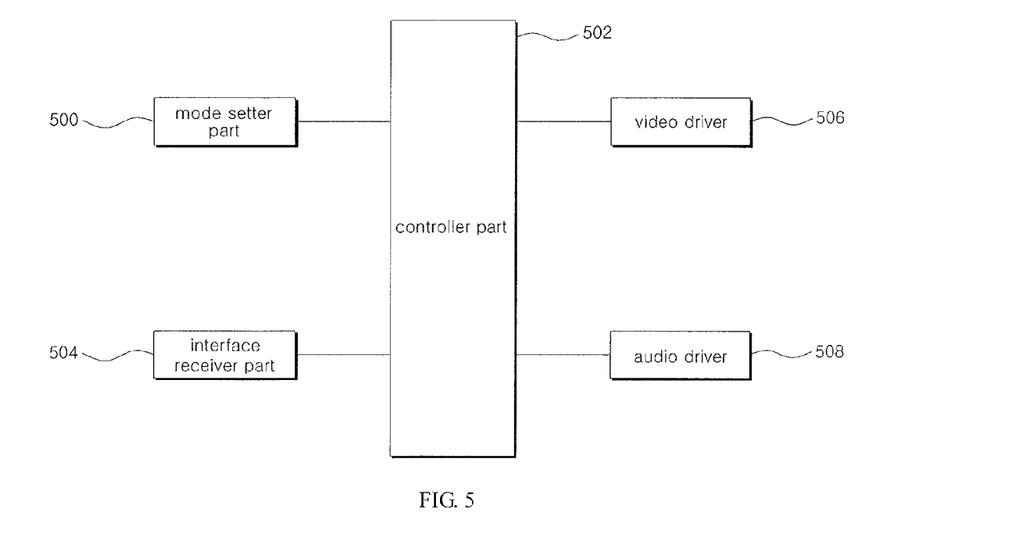
FIG. 5 is a block diagram illustrating the modules of a wearable display device according to an embodiment of the invention.

FIG. 5 is a block diagram illustrating the modules of a wearable display device according to an embodiment of the invention.

Referring to FIG. 5, a wearable display device according to an embodiment of the invention can include a mode setter part 500, a controller part 502, an interface receiver part 504, a video driver 506, and an audio driver 508.

The mode setter part 500 may serve to check whether the display unit 200 is in an extended state, as illustrated in FIG. 2, or in a retracted state, as illustrated in FIG. 4, and to configure the settings to a mode corresponding to the checked state. When the display unit 200 is in an extended state, the wearable display device according to an embodiment of the invention may operate in a mode in which all functions are active.

When the display unit 200 is in a retracted state, the wearable display device according to an embodiment of the invention may operate in a mode in which only some of the functions are active.

The interface receiver part 504 may serve to receive from the user a control command for an interface and forward the user's control command to the controller part 502.

The video driver 506 may serve to generate image signals that are to be shown on the image viewer unit 230. When the display unit 200 is in a retracted state, the functions of the video driver 506 may be deactivated.

The audio driver 508 may serve to generate audio signals that are to be provided to the user.

The controller part 502 may control the overall operations of the wearable display device and may process any control commands when they are received from the user.

Figure 6:
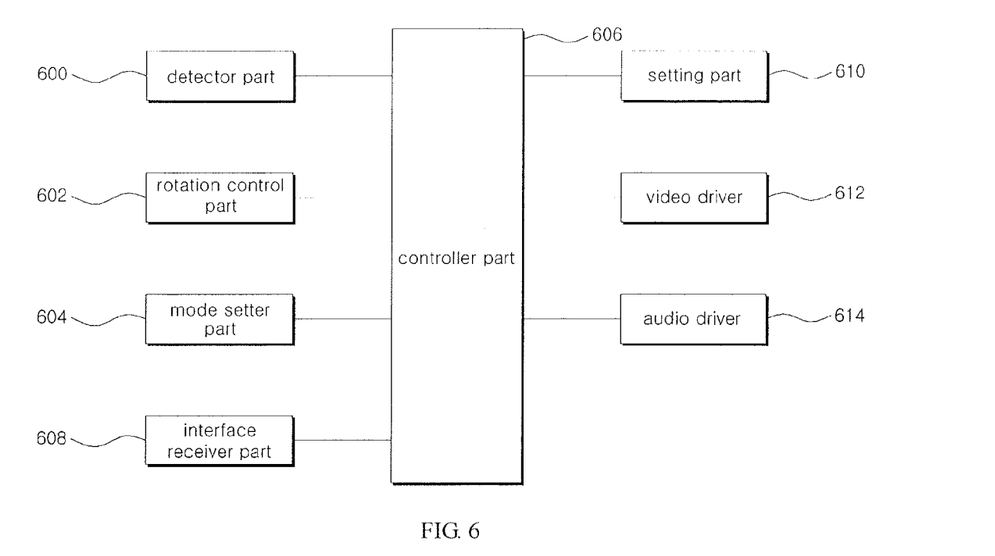
FIG. 6 is a block diagram illustrating the modules of a wearable display device according to another embodiment of the invention.

FIG. 6 is a block diagram illustrating the modules of a wearable display device according to another embodiment of the invention.

Referring to FIG. 6, a wearable display device according to another embodiment of the invention may include a detector part 600, a rotation control part 602, a mode setter part 604, a controller part 606, an interface receiver part 608, a setting part 610, a video driver 612, and an audio driver 614.

The modules of the wearable display device illustrated in FIG. 6 may be for an embodiment in which the rotation of the display unit 200 is achieved automatically by the use of a motor.

The rotation control part 602 may control the rotating operation of the display unit 200. The display unit 200 may be rotated if the user requests a rotation of the display unit 200 through the interface or if a condition is detected that is associated with a setting for rotating the display unit 200.

The detector part 600 may determine whether or not a condition occurs that is associated with a setting for rotating the display unit. The detector part 600 may determine whether or not a condition has occurred that is associated with a setting for rotating the display unit by analyzing the detection signals detected by the sensor unit 208.

Figure 7:
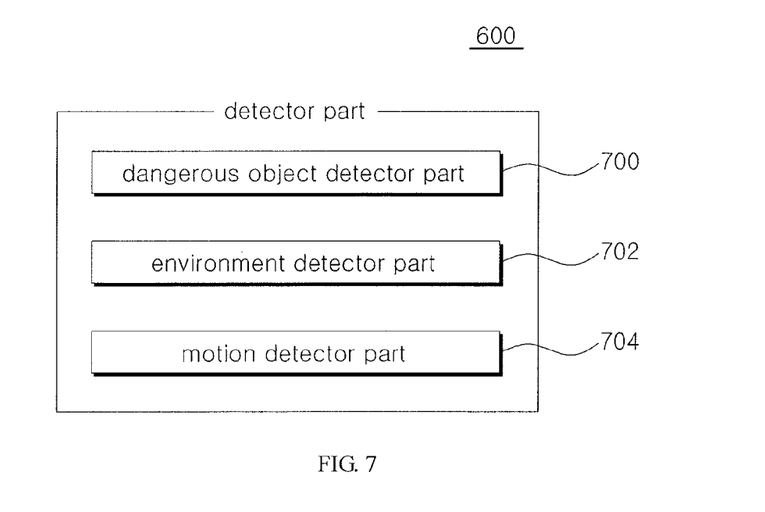
FIG. 7 is a block diagram illustrating the modular composition of a detector part according to an embodiment of the invention.

FIG. 7 is a block diagram illustrating the modular composition of a detector part according to an embodiment of the invention.

Referring to FIG. 7, a detector part 600 according to an embodiment of the invention may include a dangerous object detector part 700, an environment detector part 702, and a motion detector part 704.

The dangerous object detector part 700 may analyze the information outputted from the sensor unit 208 to determine whether or not a dangerous object approaches the user. The dangerous object detector part 700 can determine whether or not a dangerous object approaches the user by analyzing image information provided from the sensor unit 208.

According to an embodiment of the invention, the dangerous object detector part 700 may determine whether or not a dangerous object approaches the user by using at least one of an object feature, an object velocity, and an object direction or a combination thereof.

Figure 8:
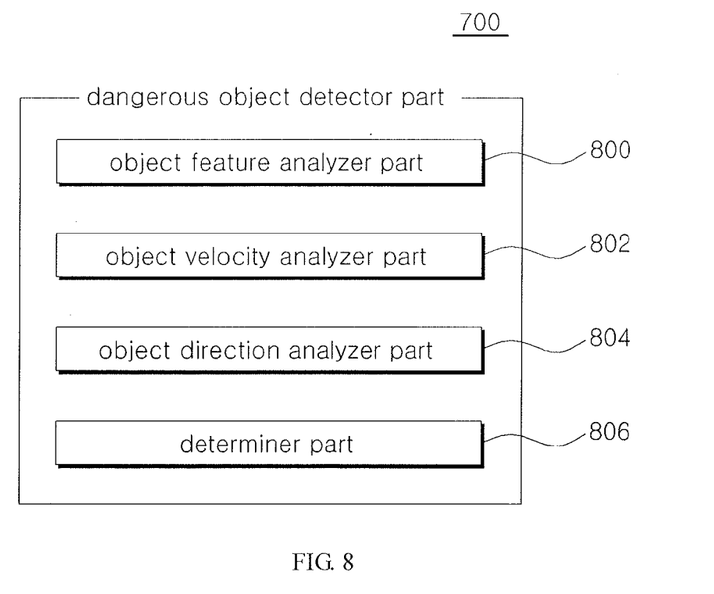
FIG. 8 is a block diagram illustrating the modular composition of a dangerous object detector part according to an embodiment of the invention.

FIG. 8 is a block diagram illustrating the modular composition of a dangerous object detector part 700 according to an embodiment of the invention.

Referring to FIG. 8, a dangerous object detector part 700 according to an embodiment of the invention can include an object feature analyzer part 800, an object velocity analyzer part 802, an object direction analyzer part 804, and a determiner part 806.

The object feature analyzer part 800 may analyze images obtained at the sensor unit 208 to determine whether or not an object exists that corresponds to a dangerous object. The information on the features of a dangerous object can be learnt beforehand, and the object feature analyzer part 800 may determine whether or not an object corresponding to a dangerous object feature learnt beforehand exists in the acquired images. Here, an object feature can include an object's shape information, color information, and the like.

The object feature analyzer part 800 can determine whether or not a dangerous object exists in the acquired images by comparing the features of objects existing in the acquired images with the features of objects learnt beforehand. The comparing of object features is well known in the art and thus will not be elaborated here.

The object velocity analyzer part 802 may serve to analyze the movement speed of a dangerous object, if it is determined that a dangerous object is present. Image information can be used for the velocity analysis can utilize, while a separate radar or ultrasonic sensor, etc., can also be used.

The object direction analyzer part 804 may serve to analyze the movement direction of a moving object. The analysis of an object's direction can be performed by using the image information.

The determiner part 806 may use the information analyzed by the object feature analyzer part 800, object velocity analyzer part 802, and object direction analyzer part 804 to determine whether or not the user faces a dangerous condition.

It is obvious to the skilled person that the determiner part 806 can not only determine whether or not the user faces a dangerous condition by considering all of the feature, velocity, and direction of an object, but also can be set to detect a danger simply if a dangerous object exists in front, irrespective of the velocity or direction of the object. In such cases, the dangerous object detector part can detect a danger by analyzing only the object features.

Also, even when a particular object is determined not to correspond to a dangerous object set beforehand, if it is determined at the object velocity analyzer part 802 that the object is approaching the user with a velocity greater than or equal to a threshold velocity, the determiner part can determine that the user faces a dangerous condition.

The environment detector part 702 may serve to detect whether the environment in which the user is located is outdoors or indoors. According to an embodiment of the invention, the issue of whether or not the user is indoors can be detected by using at least one of illuminance, light wavelengths, and temperature or a combination thereof.

The environment detector part 702 can also determine whether or not the user is indoors by using radio signals. For example, if the user is indoors so that the reception rate of a GPS signal is equal to or lower than a threshold value, the environment detector part 702 can determine that the user is located indoors. Also, the environment detector part 702 can determine that the user is indoors by identifying certain RFID or NFC modules installed indoors.

The motion detector part 704 may determine the movement speed of the user by using acceleration information detected from the sensor unit. The motion detector part 704 may determine that the user faces a dangerous condition when the movement speed of the user is greater than or equal to a preset threshold value.

The setting part 610 may serve to configure the activation/deactivation settings for the function of detecting and outputting danger information. As the function for detecting and outputting danger information may require a considerable amount of power, the setting part 610 may deactivate this function of detecting and outputting danger information under certain circumstances, in order to increase the battery use efficiency.

According to an embodiment of the invention, the setting part 610 may deactivate certain functions in response to the user's control command. For instance, the user may be provided with an interface for activating/deactivating the dangerous object detection function according to an embodiment of the invention, and if a control command for deactivating the detector function is selected by way of the interface, the setting part 610 may deactivate the detector function.

According to another embodiment of the invention, the setting part 610 can deactivate certain functions by using the detection information of the detector part 600. For example, the setting part 610 can deactivate the dangerous object detection function if the detector part 600 determines that the user is located indoors. In another example, the setting part 610 can deactivate the dangerous object detection function if the detector part 600 determines that the user's movement speed is equal to or lower than a preset threshold speed.

The operations of the mode setter part 604, controller part 606, interface receiver part 608, video driver 612, and audio driver 614 may be substantially the same as those of the modules described with reference to FIG. 5.

Figure 13:
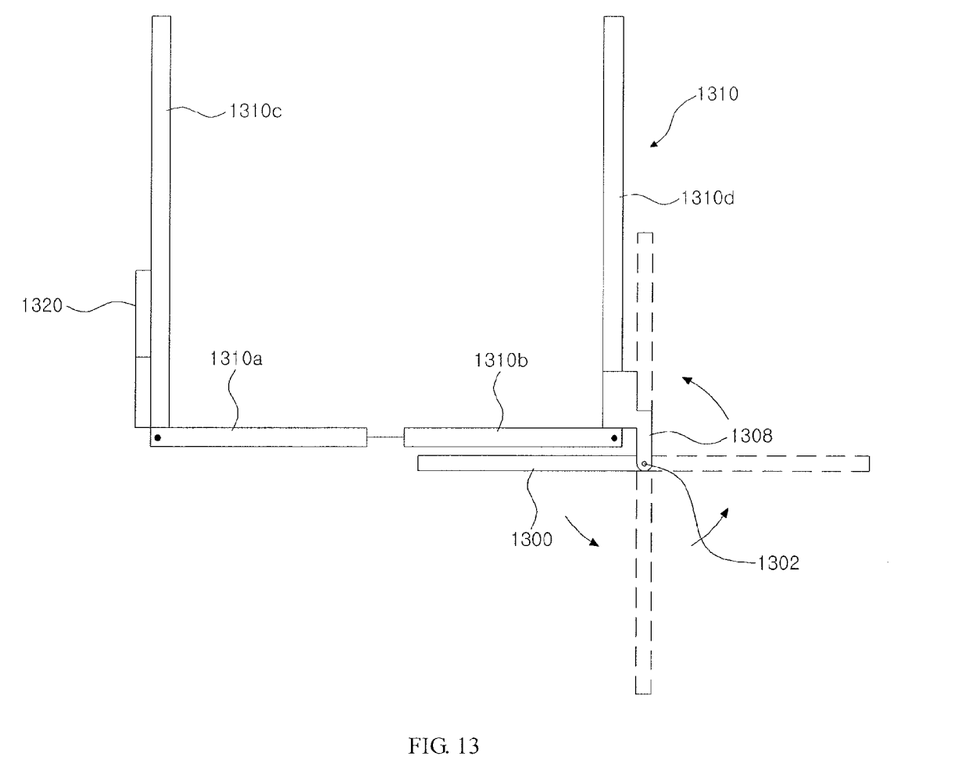
FIG. 13 is a plan view illustrating the structure of a wearable display device according to another embodiment of the invention.
Figure 14:
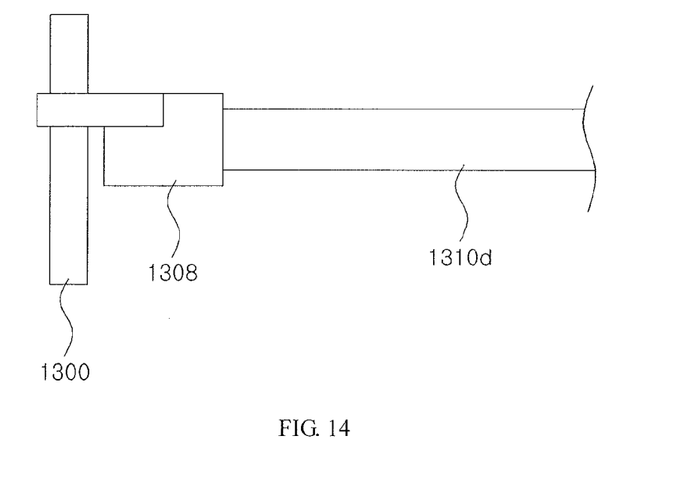
FIG. 14 is a side view of a wearable display device according to an embodiment of the invention.
Figure 15:
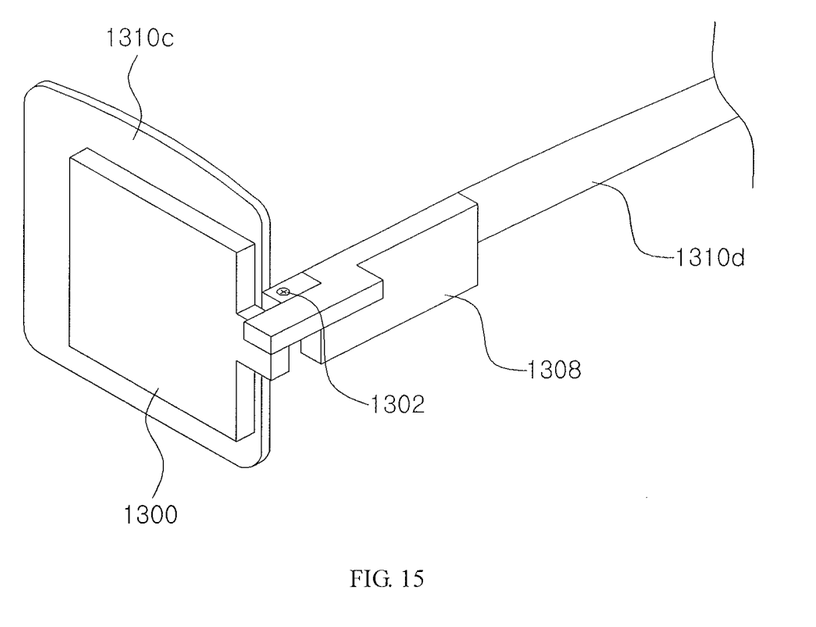
FIG. 15 is a partial perspective view illustrating the structure of a wearable display device according to another embodiment of the invention.

FIG. 13 is a plan view illustrating the structure of a wearable display device according to another embodiment of the invention, FIG. 14 is a side view of a wearable display device according to an embodiment of the invention, and FIG. 15 is a partial perspective view illustrating the structure of a wearable display device according to another embodiment of the invention.

Referring to FIG. 13, a wearable display device according to another embodiment of the invention can include a display unit 1300, a hinge 1302, a main unit 1320 that provides an interface and is equipped with a processor, and a frame 1310.

In FIGS. 13 to 15, a frame 1310 is illustrated which includes lens-mounting parts 1310a, 1310b and support parts 1310c, 1310d in a shape similar to a pair of glasses.

Unlike the embodiment illustrated in FIG. 2, the wearable display device illustrated in FIG. 13 may be structured such that the display unit 200 and the main unit 220 are separated from each other rather than being coupled together.

The frame 1310 may include two support parts 1310c, 1310d, with the main unit 1320 coupled to the first support part 1310c and the hinge 1302 coupled to the second support part 1310d opposite the first support part 1310c.

The hinge 1302 can be coupled to the frame 1310 by way of a coupling member 1308 that couples with the frame.

The display unit 1300 may be coupled onto the hinge 1302, so that the display unit 1300 may be capable of rotating by using the hinge 1302.

In the use state, the display unit 1300 may be positioned in front of the user's eye, as illustrated in FIG. 14, while in the non-use state, the display unit 1300 may be rotated to be positioned parallel to the support part 1310d of the frame 1310 and removed from the user's field of vision.

By separating the main unit 1320 and the display unit 1300 and mounting them on either side of the wearable display device, as illustrated in FIG. 13, the wearable display device can be implemented with more balance in weight on the left and right sides.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A wearable display device comprising:
   a frame;
   a display unit configured to show an image in at least a partial area thereof and positioned in front of a user's eye in a first mode;
   a main unit coupled to the frame;
   a hinge disposed at a coupling point of the display unit and the main unit to enable a rotation of the display unit;
   a detector part configured to detect a dangerous condition for a user; and
   a rotation control part configured to automatically rotate the display unit if the detector part detects the dangerous condition for the user,
   wherein the display unit is rotatable about the hinge by at least 180 degrees, and
   wherein the detector part is deactivated if the user's movement speed is equal to or lower than a preset threshold speed or the user is located indoors.

2. The wearable display device of claim 1, wherein the display unit is rotated in a second mode to be placed in contact with the main unit or in proximity with the main unit within a preset distance.

3. The wearable display device of claim 2, wherein the display unit and the main unit are disposed orthogonally in the first mode, and the display unit is rotated by approximately 270 degrees in the second mode.

4. The wearable display device of claim 2, wherein the main unit comprises an interface for control.

5. The wearable display device of claim 4, wherein the display unit is placed in contact with at least the interface of the main unit when the display unit is placed in contact with the main unit by the rotation.

6. A wearable display device comprising:
   a frame;
   a main unit coupled to the frame;
   a display unit coupled to the main unit, the display unit configured to show an image in at least a partial area thereof and positioned in front of a user's eye in a first mode;

a hinge disposed at a coupling point of the display unit and the main unit to enable a rotation of the display unit;

a detector part configured to detect a dangerous condition for a user; and a rotation control part configured to automatically rotate the display unit if the detector part detects the dangerous condition for the user, wherein the display unit is rotated to be placed in contact with the main unit or in proximity with the main unit within a preset distance, and wherein the detector part is deactivated if the user's movement speed is equal to or lower than a preset threshold speed or the user is located indoors.

7. The wearable display device of claim 6, wherein the hinge enables the display unit to rotate 270 degrees.

8. The wearable display device of claim 6, wherein the main unit comprises an interface for control.

9. A wearable display device comprising:
a frame;
a main unit coupled to the frame;
a hinge coupled to the frame;
a display unit coupled to the hinge, the display unit configured to show an image in at least a partial area thereof and positioned in front of a user's eye during use;
a detector part configured to detect a dangerous condition for a use; and
a rotation control part configured to automatically rotate the display unit if the detector part detects the dangerous condition for the user;
wherein the display unit is capable of rotating at least 180 degrees by way of the hinge, and wherein the detector pert is deactivated if the user's movement seed is equal to or lower than a preset threshold speed or the user is located indoors.

10. The wearable display device of claim 9, wherein the frame comprises a first support part and a second support part opposite the first support part for wearing on a user's head, and wherein the main unit is coupled to the first support part and the display unit is coupled to the second support part.

11. The wearable display device of claim 10, wherein the first support part is worn on the user's left ear and the second support part is worn on the user's right ear.

12. A wearable display device comprising:
a frame;
a main unit coupled to the frame;
a display unit configured to show an image in at least a partial area thereof;
a hinge for rotating the display unit;
a detector part configured to detect a dangerous condition for a use; and
a rotation control part configured to automatically rotate the display unit if the detector part detects the dangerous condition for the user,
wherein the display unit is capable of rotating at least 180 degrees between a position in front of a user's eye to the main unit while the wearable display unit is worn by the user, and
wherein the detector part is deactivated if the user's movement seed is equal to or lower than a preset threshold speed or the user is located indoors.

13. The wearable display device of claim 12, wherein the display unit comprises a camera configured to receive input of an image in front of the user's eye while the wearable display unit is worn.

* * * * *